United States Patent
Neu et al.

(10) Patent No.: US 10,414,224 B2
(45) Date of Patent: Sep. 17, 2019

(54) WHEEL SUSPENSION SYSTEM

(71) Applicant: ZF Friedrichshafen AG, Friedrichshafen (DE)

(72) Inventors: Alexander Neu, Friedrichshafen (DE); Knut Heidsieck, Bünde (DE); Peter Kontermann, Osnabrück (DE); Holger Lohmüller, Belm (DE); Witalij Knaub, Lotte (DE); Joachim Cichy, Langenargen (DE); Klaus Solik, Grafenrheinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 114 days.

(21) Appl. No.: 15/577,014

(22) PCT Filed: Apr. 25, 2016

(86) PCT No.: PCT/EP2016/059153
§ 371 (c)(1),
(2) Date: Nov. 27, 2017

(87) PCT Pub. No.: WO2016/188686
PCT Pub. Date: Dec. 1, 2016

(65) Prior Publication Data
US 2018/0154717 A1    Jun. 7, 2018

(30) Foreign Application Priority Data
May 28, 2015 (DE) .......................... 10 2015 209 844

(51) Int. Cl.
*B60G 3/20* (2006.01)
*B62D 7/06* (2006.01)
(Continued)

(52) U.S. Cl.
CPC ............... *B60G 3/20* (2013.01); *B60G 7/008* (2013.01); *B62D 7/06* (2013.01); *B62D 7/20* (2013.01);
(Continued)

(58) Field of Classification Search
CPC .... B60G 3/20; B60G 7/008; B60G 2206/124; B60G 2206/11; B60G 2206/12;
(Continued)

(56) References Cited

U.S. PATENT DOCUMENTS

| 3,379,455 A | | 4/1968 | Dahlstrom | |
| 5,496,055 A | * | 3/1996 | Shibahata | B60G 3/265 267/188 |

(Continued)

FOREIGN PATENT DOCUMENTS

| CN | 103 287 493 A | 9/2013 |
| DE | 10 2013 216 029 A1 | 2/2015 |

(Continued)

OTHER PUBLICATIONS

International Search Report Corresponding to PCT/EP2016/059153 dated Jun. 30, 2016.
(Continued)

*Primary Examiner* — Keith J Frisby
(74) *Attorney, Agent, or Firm* — Davis & Bujold PLLC; Michael J. Bujold

(57) ABSTRACT

A wheel suspension assembly (1) for a vehicle, having a spring damper (2), a first transverse link (4), which has a first transverse link strut (4a) and a second transverse link strut (4b), a second transverse link (5), a first tie rod (6), a second tie rod (7), a reversing lever (8), a hub carrier (9), a steering gear (10) and a pendulum support (11). Each transverse link (4, 5) has an end (12), on the hub carrier side, and two ends (13, 13a, 13b), on the chassis side. The steering gear (10) is
(Continued)

arranged in a plane with the first transverse link (4) and in a section between an end (13*a*) of the first transverse link strut (41) of the first transverse link (4), on the chassis side, and an end (13*b*) of the second transverse link strut (4*b*) of the first transverse link (4), on the chassis side.

10 Claims, 1 Drawing Sheet

(51) Int. Cl.
 *B60G 7/00* (2006.01)
 *B62D 7/20* (2006.01)
(52) U.S. Cl.
 CPC .... *B60G 2200/144* (2013.01); *B60G 2200/44* (2013.01); *B60G 2204/143* (2013.01); *B60G 2206/11* (2013.01); *B60G 2206/12* (2013.01); *B60G 2206/124* (2013.01)
(58) Field of Classification Search
 CPC .......... B60G 2200/44; B60G 2200/144; B60G 2204/143; B62D 7/20; B62D 7/06
 USPC ........ 280/124.1, 124.134, 124.135, 124.136, 280/124.138, 124.139, 124.141, 124.142, 280/124.143, 124.145, 124.146, 124.15, 280/124.152
 See application file for complete search history.

(56) References Cited

U.S. PATENT DOCUMENTS 5,516,130 A * 5/1996 Mitchell .................. B60G 3/20
 280/124.134
5,609,331 A 3/1997 Hoag et al.
6,719,314 B1 4/2004 Schote

FOREIGN PATENT DOCUMENTS

| DE | 10 2015 203 632 A1 | 9/2016 |
|---|---|---|
| EP | 1 500 575 A2 | 1/2005 |
| EP | 2 338 707 A1 | 6/2011 |

OTHER PUBLICATIONS

Written Opinion Corresponding to PCT/EP2016/059153 dated Jun. 30, 2016.

* cited by examiner

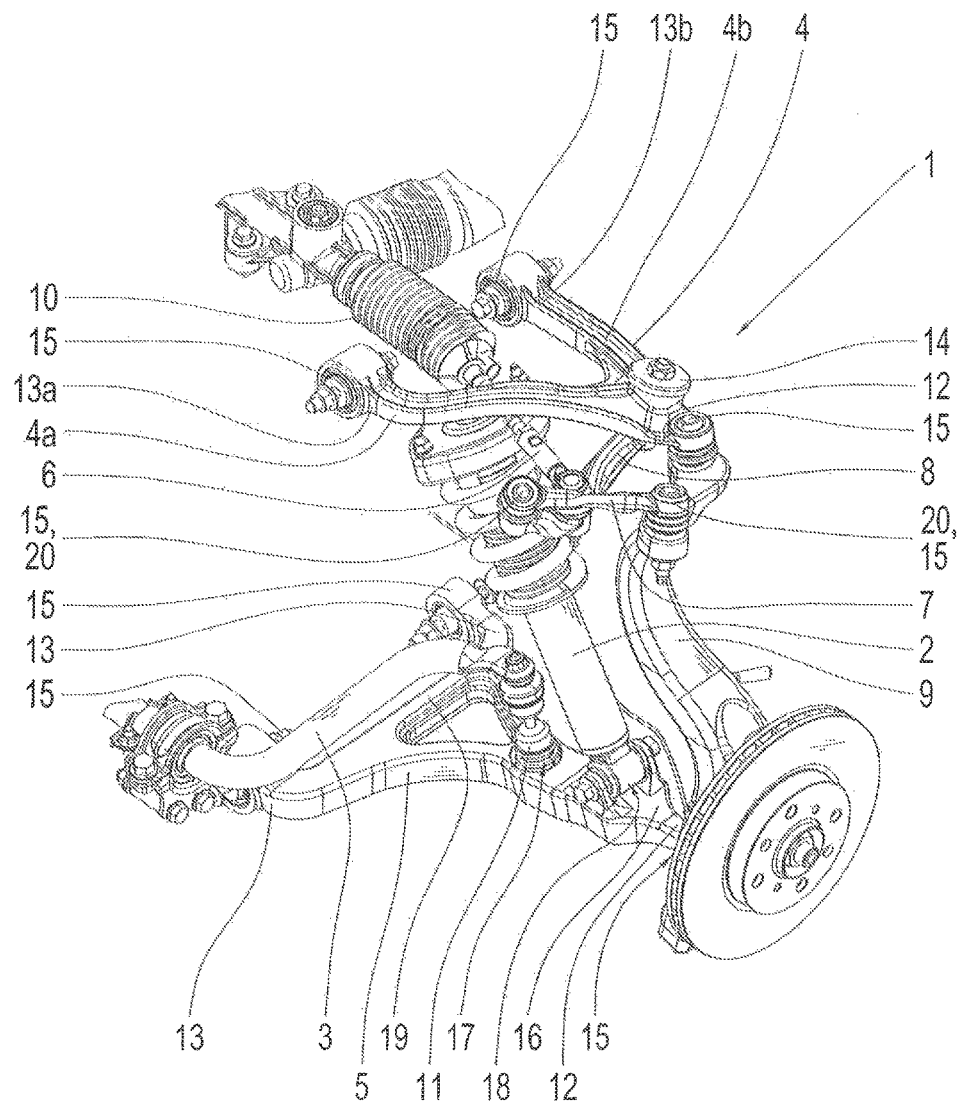

WHEEL SUSPENSION SYSTEM

This application is a National Stage completion of PCT/EP2016/059153 filed Apr. 25, 2016, which claims priority from German patent application serial no. 10 2015 209 844.3 filed May 28, 2015.

FIELD OF THE INVENTION

The present invention relates to a wheel suspension assembly for a vehicle.

BACKGROUND OF THE INVENTION

In the case of wheel suspensions for novel mobility concepts which, for example, enable steering angles of at least +/−50° up to +/−90°, the chassis kinematics becomes more complex compared to conventional axle assemblies having maximum steering angles of +/−50°, because additional components are required. In spite of the additional components in the wheel suspension, the installation space available for the wheel suspension remains the same. Frequently, a volume of installation space for the wheel suspension is defined, which may not be exceeded. Thus, an effective and optimized utilization of the available installation space is obligatory.

A wheel suspension having a hub carrier is known from the not yet published application with the application number 10 2015 203 632.4, which has a hub carrier, two coupling rods and at least one tie rod, wherein the first coupling rod and the second coupling rod are articulately connected to one another and the second coupling rod and the hub carrier are articulately connected to one another. A steering torque is transmitted by the first coupling rod, via the second coupling rod, to the hub carrier. The wheel suspension has at least one steering arm, wherein the steering arm is articulately mounted on a vehicle chassis or on a vehicle frame and articulately connected to the hub carrier. The steering arm and the first coupling rod are articulately connected to each other.

SUMMARY OF THE INVENTION

Starting from the prior art, the object of the present invention is to propose an improved wheel suspension assembly, the individual components of which are arranged relative to one another in relation to a limited available installation space for the wheel suspension in such a way that this installation space is efficiently utilized. The individual components in this arrangement are to be installed and arranged as compactly as possible relative to one another. The wheel suspension assembly is intended not to create restrictions with regard to the axle kinematics and the functionality of the wheel suspension as compared to a conventional wheel suspension.

The present invention proposes, based on the problem outlined above, a wheel suspension assembly for a vehicle having the features according to independent claim(s). Additional advantageous embodiments and refinements are described in the subclaims.

A wheel suspension assembly for a vehicle comprises a spring damper, a first transverse link, which has a first transverse link strut and a second transverse link strut, a second transverse link, a first tie rod, a second tie rod, a reversing lever, a hub carrier, a steering gear and a pendulum support. Each transverse link has one end on the hub carrier side and two ends on the chassis side. The steering gear is arranged in a plane with the first transverse link, wherein the steering gear is arranged in a section between a first end of the first transverse link strut of the first transverse link on the chassis side and a second end of the second transverse link strut of the first transverse link on the chassis side. The wheel suspension assembly also has a stabilizer bar and is designed as an independent suspension.

A wheel suspension is generally defined as a device for connecting at least one wheel to a vehicle chassis and/or to a vehicle frame. In general, the attachment is spring-loaded, for example, also steerable for a front axle. Thus, the wheel suspension connects the hub carrier to the vehicle chassis and/or to the vehicle frame in such a way that a wheel rotatably mounted on the hub carrier is spring-loaded and optionally steerable.

A spring damper is defined as a device that combines a shock absorber with a spring. The spring is designed as a coil spring and encircles a section of the shock absorber. The spring and the shock absorber operate in the same direction of movement. The spring damper in this case has a standard design.

The transverse links are installed transversely to the direction of travel when the wheel suspension is used in a vehicle. The first transverse link has a first transverse link strut and a second transverse link strut. The first transverse link strut of the first transverse link has a first end on the chassis side. The second transverse link strut of the first transverse link has a second end on the chassis side. The first transverse link further has an end on the hub carrier side. The second transverse link has a first end on the chassis side and a second end on the chassis side as well as an end on the hub carrier side. The end of a transverse link strut or of a transverse link on the chassis side is the end that is supported on a vehicle chassis or on a vehicle frame when the transverse link is used in a vehicle. The end of a transverse link on the hub carrier side is the end that is connected to the hub carrier of the wheel suspension assembly when the transverse link is used in a vehicle. Both transverse links are preferably shaped as triangular transverse links. The first transverse link is an upper transverse link, the second transverse link is a lower transverse link. The numbering in this case and throughout the text is merely for ease of distinguishability and is not an indication of primacy.

A tie rod is a component of a steering mechanism and serves to transmit a steering torque to the hub carrier. During steering, the tie rod performs a translational movement and/or a displacement at least partially in the transverse direction of the vehicle. Thus, during steering there is a movement component of the tie rod, which proceeds in the vehicle transverse direction. Vehicle transverse direction is understood to mean a direction orthogonal to the vehicle longitudinal direction, which also extends horizontally. The vehicle longitudinal direction coincides with the direction of travel when traveling straight ahead.

A reversing lever is defined as a component of a wheel suspension, which contributes to the steering movement. The reversing lever transfers a steering movement, which has been transferred to the first tie rod from the steering gear, to the second tie rod. A hub carrier is defined as the component of the wheel suspension assembly that is connected to a wheel of the vehicle when the wheel suspension assembly is used in a vehicle.

The steering gear translates the rotational movement of a steering wheel of the vehicle into pivotal movements of the steered wheels of the vehicle. A steering gear in this case is understood to mean, for example, a rack-and-pinion steering gear. A pendulum support is understood to mean a rod-shaped component that is able to transmit longitudinal forces only, but no torques or transverse forces. The longitudinal force in this case passes precisely through the two bearing points of the pendulum support. The pendulum support extends from one bearing point to a second bearing point.

The steering gear is arranged in design configuration in a plane with the first transverse link. This plane is spanned by the ends on the chassis side and the end on the hub carrier side of the first transverse link. In other words, the first transverse link and the steering gear are equidistant to the road surface when the wheel suspension assembly is used in a vehicle. The first transverse link is shaped in such a way that the two transverse link struts thereof are connected only at the end on the hub carrier side. Thus, there is a material-free installation space between the ends of the transverse link on the chassis side. A section of the steering gear is arranged in design attitude in this material-free installation space. This means that the steering gear is not arranged entirely between the ends of the transverse link struts of the first transverse control on the chassis side. Merely a section of the steering gear is arranged in such a manner. The arrangement between the ends of the first transverse link on the chassis side is understood to mean a purely spatial arrangement, hence, there is no functional connection.

The precise positioning of the steering gear is defined on the one hand by an installation space requirement of the steering gear in the design attitude and by an installation space requirement of the steering gear in a vehicle operating state on the other hand, when the wheel suspension assembly is used in a vehicle. The positioning of the steering gear is further defined by an installation space requirement of the first transverse link and of the adjoining components, for example, of the second tie rod or of the spring damper, both in the design attitude as well as in a vehicle operating state.

With the arrangement of the steering gear in a plane with the first transverse link and with the arrangement of the section of the steering gear between the ends of the first transverse link stud of the first transverse control on the chassis side and the end of the second transverse link stud of the first transverse link on the chassis side, it is possible, in contrast to a conventional wheel suspension, to efficiently and optimally utilize the installation space available for the wheel suspension assembly. In contrast to a conventional wheel suspension, installation space is advantageously saved with the wheel suspension assembly according to the present invention. The entire upper plane of the transverse link may thus be constructed more compactly than in a conventional wheel suspension, without having to accept losses relating to axial kinetics, stability or functionality of the wheel suspension.

According to a first embodiment, the steering gear is operatively connected to the first tie rod and the first tie rod is operatively connected to the reversing lever. The reversing lever in this embodiment serves as an additional steering transmission. With this additional steering transmission, it is possible by means of the wheels suspension assembly to implement a steering angle from at least +/−50° up to +/−90° on the wheel connected to the hub carrier when the wheel suspension assembly is used in a vehicle.

According to another embodiment, the reversing lever has a double arched shape, the shape thereof being defined by a steering range and by a shape of the hub carrier in a section of the reversing lever, which is arranged in a plane with the hub carrier, and a suspension range and a shape of the first transverse link in a section of the reversing lever, which is arranged in a plane with the first transverse link. In other words, the reversing lever has an arch around the hub carrier as well as an arch around the first transverse link.

The steering range of the hub carrier in this case is the maximum range required by the hub carrier when executing a pivotal movement initiated by a steering motion. This steering motion normally occurs in a vehicle operating state. The steering range is a volume, which is virtually filled by the hub carrier as a result of the maximum possible movements, for example, pivotal movements, and must therefore remain free of material in order to prevent the individual components from colliding.

The suspension range of the first transverse link in this case is the maximum range required by the first transverse link during a downwards movement due to compression of the suspension deflection. The downwards movement due to compression of the suspension normally occurs during a vehicle operating state. The suspension range is a volume, which is virtually filled by the first transverse link as a result of the maximum possible movement, for example, downwards movements due to compression of the suspension, and must therefore remain free of material in order to prevent the individual components from colliding.

Thus, the shape of the reversing lever conforms on the one hand to the suspension range of the first transverse link and to the steering range of the hub carrier, and on the other hand the shape of the reversing lever conforms to the shape of the hub carrier in the section that shares a plane with the reversing lever, and to the shape of the first transverse in the section that shares a plane with the reversing lever. The form of the steering range naturally also conforms to the shape of the hub carrier. The form of the suspension range naturally also conforms to the shape of the first transverse link. Thus, the reversing lever is designed in such a way that no collisions of the reversing lever with the hub carrier and/or with the first transverse link and/or with additional components of the wheel suspension assembly occur, either in the design attitude or in a vehicle operating state. This adapted shape of the reversing lever enables a more compact construction and saves installation space, as compared to a conventional wheel suspension assembly. Thus, the available installation space is efficiently utilized.

According to another embodiment, the second tie rod is mounted on the hub carrier by means of a first ball pivot and on the reversing lever by means of a second ball pivot, wherein the rotational axes of the ball pivots of the second tie rod are skewed relative to one another.

In order to utilize the available installation space for the wheel suspension assembly efficiently and optimized, the position of these two axes of rotation of the ball pivots is defined by a movement range of the second tie rod. In a vehicle operating state, the second tie rod performs a movement initiated by the steering motion. The steering movement is transmitted by the steering gear to the second tie rod by means of the first tie rod and by means of the reversing lever. The second tie rod transmits the steering movement to the hub carrier. The two rotational axes of the ball pivots are thus arranged in such a way that the second tie rod is able to perform this movement unhindered during a vehicle operating state, when the wheel suspension assembly is used in a vehicle, and does not collide with one or multiple components of the wheel suspension assembly such as, for example, the hub carrier, a housing or the reversing lever.

The second tie rod may, for example, be twisted in shape. The twisted shape of the second tie rod in this case means that the attachment points of the second tie rod, at which the ball pivots are coupled to the tie rod, are not oriented in the same direction. This shape is due to the skewed arrangement of the rotational axes of the ball pivots. In addition or alternatively, the shape of the second tie rod may, for example, be tapered in a central section between the two ball pivots.

According to another embodiment, the second transverse link has a kinematics point on the hub carrier side, a web and an attachment point, wherein the web extends from the kinematics point of the second transverse link on the hub carrier side to the attachment point of the second transverse link, wherein the second transverse link is connected to the pendulum support by means of the attachment point.

A kinematics point in this case is a section of the transverse link to which this transverse link may be articulately connected to other components of the wheel suspension. An articulated connection of two components refers to a connection of the two components by means of a joint in such a way that the two components may be twisted relative to one another around at least one rotational axis. Thus, articulated connections are possible about precisely one rotational axis, about precisely two rotational axes and about precisely three rotational axes. An articulated connection prevents any translational movement of the two components relative to one another. The second transverse link is therefore articulately connected to the hub carrier by means of the kinematics point on the hub carrier side.

The web of the second transverse link extends from the kinematics point of the second transverse link on the hub carrier side to the attachment point of the second transverse link, by means of which the pendulum support is connected to the second transverse link. The web of the second transverse link is designed narrower and longer than an end of a conventional transverse link on the hub carrier side. As a result, the transverse link assumes a Y-shape. However, this design does not impair the stability and the functionality of the second transverse link.

According to another embodiment, the shape of the web of the second transverse link is defined by the steering range of the hub carrier. The shape may also be defined by a pivot range of a wheel, which is connected to the hub carrier when the wheel suspension assembly is used in a vehicle. The web may, for example, taper close to the hub carrier, to prevent the hub carrier from colliding with the web of the second transverse link when a maximum steering turning angle is adopted.

According to another embodiment, the second transverse link has a connection point on its web, by means of which the second transverse link is connected to the spring damper. This connection point is arranged dose to the kinematics point of the second transverse link on the hub carrier side. The spring damper is connected to the connection point of the second transverse link on its side facing away from the spring. The positioning of the connection point in this case conforms to the steering range of the hub carrier, since the hub carrier or a wheel connected to the hub carrier must not collide with the spring damper in the case of a steering angle set to maximum. For example, the tapering of the web may extend from the kinematics point of the second transverse link on the hub carrier side to the connection point.

According to another embodiment, the reversing lever is articulately mounted on the first transverse link. The articulated mounting may be implemented, for example, with the aid of two tapered roller bearings braced against one another.

According to another embodiment, the first transverse link strut of the first transverse link has a curvature in a spatial direction, wherein this spatial direction is an axis vertical to a plane, which is spanned by the two ends on the chassis side and by the ends of the transverse link on the hub carrier side. A spatial direction is understood to mean the directional axes of a Cartesian coordinate system, i.e., the x-, y- and z-axes. The kinematics points of the two transverse link struts span the plane. The spatial direction in this plane, in which the at least one transverse link strut is curved, is perpendicular, for example. In other words, the spatial direction is a vertical axis, the z-axis. When using the transverse link in the axial arrangement of a vehicle, for example, the spatial direction in the design configuration is perpendicular to the surface of a road.

A curvature is understood to mean an arched shape of the first transverse link of the first transverse link, which has a maximum. Of all ranges of the first transverse link, this maximum has the greatest distance to the plane, which is spanned by the two ends on the chassis side and by the end of the first transverse link on the hub carrier side. This maximum also has the greatest distance to a surface of a road of all ranges of the transverse link when the wheel suspension assembly is used in a vehicle.

The curvature is designed in such a way with respect to an available installation space for the wheel suspension assembly that no conflicts, for example, collisions, occur with other components of the wheel suspension assembly, neither in design attitude nor in a vehicle operating state. Moreover, the curvature does not result in losses with respect to component stability and component kinematics of the transverse link. The curvature is designed in such a way that a material-free area is created, through which additional components of the wheel suspension assembly may be guided. In this case, it is advantageous that the transverse link and at least one additional component of the wheel suspension assembly of the vehicle may be spatially closely arranged, resulting in a smaller installation space requirement than in a first transverse link having a completely planar design.

BRIEF DESCRIPTION OF THE DRAWING

An exemplary embodiment and details of the invention are described in greater detail with reference to the FIGURE explained below.

In the drawing, the sole FIGURE shows a schematic representation of a wheel suspension assembly according to one exemplary embodiment.

DETAILED DESCRIPTION OF THE PREFERRED EMBODIMENTS

The FIGURE shows a schematic representation of a wheel suspension assembly 1 according to one exemplary embodiment. The wheel suspension assembly 1 has the following components: a spring damper 2, a stabilizer bar 3, a first transverse link 4, a second transverse link 5, a first tie rod 6, a second tie rod 7, a reversing lever 8, a hub carrier 9 and steering gear 10 and a pendulum support 11. The wheel suspension assembly 1 is shown in the design configuration.

The first transverse link 4 is shaped as a triangular transverse link and is the upper transverse link. The first transverse link 4 has a first transverse link strut 4a and a second transverse link strut 4b. In addition, the first transverse link has a hub carrier end 12 and two ends 13a, 13b on the chassis side. The first transverse link strut 4a of the first transverse link 4 is delimited by the hub carrier end 12 and by one of the ends 13a on the chassis side. The second transverse link strut 4b of the first transverse link 4 is delimited by the hub carrier end 12 and by another of the ends 13b on the chassis side. The two transverse link struts 4a, 4b of the first transverse link 4 are fixedly and permanently connected to one another at the hub carrier end 12. The two transverse link struts 4a, 4b are not connected to one another at the ends 13a, 13b of the first transverse link on the chassis side. Thus, there is a material-free area, i.e., a material free volume between the end 13a of the first transverse link strut 4a of the first transverse link 4 on the chassis side and the end 13b of the second transverse link strut 4b of the first transverse link 4 on the chassis side.

The first transverse link 4 has a kinematics point 15 at the end 13a of the first transverse link strut 4a of the first transverse link 4 on the chassis side, which is shaped, for example, as swivel joint. The first transverse link 4 has a further kinematics point 15 on the end 13b of the second transverse link strut 4b of the first transverse link 4, which is shaped, for example, as a swivel joint. A kinematics point 15 in this case is a section of the transverse link 4, 5, at which the transverse link 4, 5 may be articulately connected to other components of the wheel suspension 1. If the wheel suspension assembly 1 is used in a vehicle, the first transverse link 4 may then be articulately connected with the aid of the kinematics points 15 at its ends 13a, 13b on the chassis side with, for example, a vehicle chassis or a vehicle frame. The rotational axes of the joints of the two kinematic points 15 of the first transverse link 4 on the chassis side are coaxial relative to one another. The transverse link 4 has at its hub carrier end 12 a kinematics point 15, which is shaped, for example, as a swivel joint. The first transverse link 4 is articulately connected to the hub carrier 9 by means of the kinematic point 15 on the hub carrier side. The first transverse link 4 delimits the wheel suspension assembly 1 upwardly.

A section of the steering gear 10 is arranged in the material-free space between the two ends 13a, 13b of the first transverse link 4 on the chassis side. The section of the steering gear 10 in this case is arranged between the two ends 13a, 13b of the first transverse link 4 on the chassis side in such a way that the steering gear 10 has sufficient space available, both in the design attitude as well as in a vehicle operating state, when the wheel suspension assembly 1 is used in a vehicle, so that the steering gear 10 does not collide with the first transverse link 4 or with another component of the wheel suspension assembly 1. The section of the steering gear 10 in this case is arranged purely spatially between the two ends 13a, 13b of the first transverse link 4 on the chassis side, there is no functional connection. The steering gear 10 shares a plane as the first transverse link 4.

The steering gear 10 is operatively connected to the first tie rod 6. Steering movement introduced by the steering gear 10 is thus transmitted to the first tie rod 6. The first tie rod 6 is arranged in a section below the first transverse link strut 4a of the first track control arm 4. Thus the first transverse link 4a spans the section of the first tie rod 6. The first transverse link strut 4a has a curvature, which has a maximum. The curvature of the first transverse link strut 4a is oriented in the direction of a vertical axis. Thus, of all the points on the first transverse link 4, the maximum of the curvature of the first transverse link strut 4a has the greatest distance from the second transverse link 5. The curvature of the first transverse link strut 4a in this case is adapted both to the spatial requirement of the first tie rod 6 in the design attitude and to the spatial requirement of the first tie rod 6 in a vehicle operating state, when the wheel suspension assembly 1 is used in a vehicle. The curvature is thus shaped to prevent the first tie rod 6 from colliding with the first transverse link 4.

The first tie rod 6 is operatively connected to the reversing lever 8. Steering movement is therefore transmitted from the first tie rod 6 to the reversing lever 8. The reversing lever 8 performs an additional steering transmission of the steering movement. The reversing lever 8 is movably mounted on the first transverse link 4 by means of an articulated mounting 14. The reversing lever 8 also has a double arched shape. This shape is defined on the one hand by a steering range and by a shape of the hub carrier 9 in a section of the reversing lever 8, which is arranged in a plane with the hub carrier 9. The shape of the reversing lever 8 ensures in a vehicle operating state, when the wheel suspension assembly 1 is used in a vehicle, that the hub carrier 9 has sufficient space to carry out a swivel movement, which is initiated by the steering movement introduced by the steering gear 10 into the wheel suspension assembly 1. The shape of the reversing lever 8 is also defined by a suspension range and a shape of the first transverse link 4 in a section of the reversing lever 8, which is arranged in a plane with the first transverse link 4. The shape of the reversing lever 8 ensures in a vehicle in an operating state, when the wheel suspension assembly 1 is used in a vehicle, that the first transverse link 4 has sufficient space to carry out a suspension movement. In other words, the reversing lever 8 has an arch around the hub carrier 9 as well as an arch around the first transverse link 4.

The reversing lever 8 is articulately connected to the second tie rod 7 by means of a kinematics point 15. A steering movement is thus transmitted from the reversing lever 8 to the second tie rod 7. The articulated connection of the second tie rod 7 to the reversing lever 8 is shaped as a ball pivot 20. The second tie rod 7 is operatively connected at an additional kinematics point 15 to the hub carrier 9. The articulated connection is also shaped as a ball pivot 20. The second tie rod 7 in this case is tapered in a center section between the two ball pivots 20. The rotational axis of the ball pivot 20, which connects the second tie rod 7 to the reversing lever 8, is skewed relative to the rotational axis of the ball pivot 20, which articulately connects the second tie rod 7 to the hub carrier 9. A steering movement is transmitted from the second tie rod 7 to the hub carrier 9, after which the hub carrier 9 performs a pivotal movement to the right or to the left. If the wheel suspension assembly is used in a vehicle, a steering angle of at least +/−50° to +/−90° may be set at a wheel connected to the hub carrier 9 as a result of this swivel movement.

The second transverse link 5 represents a lower transverse link and is shaped as a triangular transverse link. The second transverse link 5 is moreover shaped similar to a "Y". The second transverse link 5 has a hub carrier end 12 and two ends 13 on the chassis side. The hub carrier end 12 of the second transverse link 5 has a kinematics point 15. The hub carrier 9 is articulately connected to the second transverse link 5 by means of this kinematics point 15, which is shaped like a ball pivot or ball joint. Each end 13 on the chassis side has a kinematics point 15. The second transverse link 5 may be supported on the vehicle chassis by means of the kinematics point when the wheel suspension assembly 1 is used in a vehicle. The second transverse link 5 is shaped differently from the first transverse link 4. The second transverse link 5 has a connection element 19 close to the two ends 13 of the second transverse link on the chassis side.

The second transverse link 5 also has a web 16. The web 16 extends from the kinematics point 15 of the hub carrier end 12 to an attachment point 17, at which the pendulum support 11 is connected to the second transverse link 5. The web 16 of the second transverse link 5 also has a connection point 18, at which the spring damper 2 is connected to the second transverse link 5. The web 16 has a tapering, which extends from the connection point 18 to the end 12 of the second transverse link 5 on the hub carrier side. Thus, the web is wider at the connection point 18 than at the kinematics point 15 of the hub carrier end 12 of the second transverse link 5. The shape of the web 16 conforms to the steering range of the hub carrier 9. If a maximum steering angle is set at the hub carrier 9 in a vehicle operating state, the shape of the web 16 offers sufficient space to prevent a collision of the hub carrier 9 or of a wheel connected to the hub carrier 9 with the web 16 of the second transverse link 5, when the wheel suspension assembly 1 is used in a vehicle.

The pendulum support 11 is connected to the second transverse link 5 at the attachment point 17 of the second transverse link 5. The pendulum support 11 is arranged perpendicularly on the second transverse link 5 in the design attitude depicted. The stabilizer bar 3 is connected to the pendulum support 11. Thus, the stabilizer bar is arranged at an offset in the direction of the transverse link 4, spaced apart from the second transverse link 5. The stabilizer bar 3 is shaped in such a way that it efficiently utilizes the installation space available for the wheel suspension assembly 1. The shape of the stabilizer bar 3 thus conforms to the installation space requirement of the remaining components of the wheels suspension assembly 1, both in the design attitude as well as in the vehicle operating state, when the wheel suspension assembly 1 is used in a vehicle.

The spring damper 2 is connected to the second transverse link at the connection point 18. The spring damper 2 in this case has a standard shape, wherein the connection point 18 delimits the spring damper 2 downwardly. The spring damper 2 is not positioned perpendicularly on the second transverse link 5, but deviates at a sharp angle from the perpendicular. Thus, the spring damper 2 is arranged diagonally relative to the lower transverse link 5. The spring damper 2 has a connection point located opposite the connection point 18 and delimits the spring damper 2 upwardly. The spring damper 2 may be supported at this connection point on a vehicle chassis, when the wheel suspension assembly 1 is used in a vehicle.

When considering the wheel suspension assembly 1 in its entirety, each component of the wheel suspension assembly 1 is arranged in the wheel suspension assembly 1 in such a way that the available installation space is efficiently utilized. The individual components of the wheel suspension assembly 1 are therefore installed closely to one another, wherein the spacing of the components relative to one another conforms to space requirement of each individual component, both in a design attitude as well as in a vehicle operating state.

The exemplary embodiments depicted here are selected only by way of example. For example, the hub carrier may be shaped differently than depicted. The second transverse link may also have a different shape in the area of its web. For example, the kinematics points may be shaped by other suitable joints. The run of the curve of the first transverse link strut of the first transverse link may, for example, differ from that depicted.

LIST OF REFERENCE NUMERALS

1 wheel suspension assembly
2 spring damper
3 stabilizer bar
4 first transverse link
4*a* first transverse link strut
4*b* second transverse link strut
5 second transverse link
6 first tie rod
7 second tie rod
8 reversing lever
9 hub carrier
10 steering gear
11 pendulum support
12 end on the hub carrier side
13 end on the chassis side
13*a* end on the chassis side
13*b* end on the chassis side
14 articulated bearing
15 kinematics point
16 web
17 attachment point
18 connection point
19 connection point
20 ball pivot

The invention claimed is:

1. A wheel suspension assembly for a vehicle, the wheel suspension assembly comprising:
   a spring damper,
   a first transverse link having a first transverse link strut and a second transverse link strut,
   a second transverse link,
   a first tie rod,
   a second tie rod,
   a reversing lever,
   a hub carrier,
   a steering gear, and
   a pendulum support,
   each of the first and the second transverse links having an end on a hub carrier side and two ends on a chassis side,
   the steering gear being arranged in a plane with the first transverse link, and
   the steering gear being arranged in a section between an end of the first transverse link strut of the first transverse link on the chassis side and an end of the second transverse link strut of the first transverse link on the chassis side.

2. The wheel suspension assembly according to claim 1, wherein the steering gear is operatively connected to the first tie rod, and the first tie rod is operatively connected to the reversing lever.

3. The wheel suspension assembly according to claim 1, wherein the reversing lever has a double arched shape, a shape of the reversing lever is defined by a steering range and a shape of the hub carrier in a section of the reversing lever that is arranged in a plane with the hub carrier, as well as a suspension range and a shape of the first transverse link in a section of the reversing lever that is arranged in a plane with the first transverse link.

4. The wheel suspension assembly according to claim 1, wherein the second tie rod is mounted on the hub carrier by a first ball pivot (20) and is mounted on the reversing lever by a second ball pivot, and rotational axes of the first and the second ball pivots of the second tie rod are skewed relative to one another.

5. The wheel suspension assembly according to claim 1, wherein the second transverse link has a kinematics point on the hub carrier side, a web and an attachment point, the web extends from the kinematics point of the second transverse link on the hub carrier side to the attachment point of the second transverse link, and the second transverse link is connected to the pendulum support by the attachment point.

6. The wheel suspension assembly according to claim 5, wherein the web of the second transverse link has a shape defined by the steering range of the hub carrier.

7. The wheel suspension assembly according to claim 5, wherein the second transverse link has a connection point on the web by which the second transverse link is connected to the spring damper.

8. The wheel suspension assembly according to claim 1, wherein the reversing lever is articulately mounted on the first transverse link.

9. The wheel suspension assembly according to claim 1, wherein the first transverse link strut of the first transverse link has a curvature in a spatial direction, and the spatial direction is a vertical axis relative to a plane, which is spanned by the two ends on the chassis side and by the end of the first transverse link on the hub carrier side.

10. A wheel suspension assembly for a vehicle, a direction of straight forward travel of the vehicle being a vehicle longitudinal direction, the wheel suspension assembly comprising:

a spring damper,
a first tie rod,
a second tie rod,
a reversing lever,
a hub carrier,
a steering gear, and
a pendulum support;
a first transverse link having a first transverse link strut and a second transverse link strut;
a second transverse link;
each of the first and the second transverse links having a hub carrier side end and two chassis side ends;
the steering gear being arranged in a plane with the first ransverse link, and
the steering gear being arranged, with respect to the vehicle longitudinal direction, in an area between a chassis side end of the first transverse link strut of the first transverse link and a chassis side end of the second transverse link strut of the first transverse link.

* * * * *